May 11, 1954

W. W. HAGNAUER 2,678,059

TORQUE NEUTRALIZING DEVICE

Filed April 17, 1951

Inventor
WALDO W. HAGNAUER

By Wheeler, Wheeler & Wheeler
Attorneys

Patented May 11, 1954

2,678,059

UNITED STATES PATENT OFFICE 2,678,059

TORQUE NEUTRALIZING DEVICE

Waldo W. Hagnauer, Waukegan, Ill.

Application April 17, 1951, Serial No. 221,365

13 Claims. (Cl. 137—376)

This invention relates to a device to neutralize torque exerted on apparatus having flexible couplings across which differential pressures manifest themselves.

For example, in large mechanical apparatus, such as steam turbine condensers, large diameter input and discharge conduits are provided through which cooling liquid under pressure flows. These conduits are desirably connected to stationary pipes through flexible couplings across which the pressure in the pipe acts upon the condenser. Pressure drop through the apparatus, such as that caused by hydraulic friction, results in differential pressure at the inlet and outlet and consequently an unbalance of force exerted on the condenser. This unbalance is expressed in terms of torque acting in the direction of the unbalanced force. The presence of such unbalanced forces, and resultant torque, has heretofore required that the apparatus be braced in such a way as to resist the unbalanced force lest the apparatus be bodily shifted on its mountings or otherwise become dislocated respecting other apparatus to which it is physically connected.

The primary object of this invention is to provide a torque or force neutralizing device which corrects the aforenoted unbalance without requiring bracing of any kind for this purpose. In its broad aspects the invention comprises structural connections which utilize the differential pressure in the apparatus to counteract the unbalance, and thereby eliminate all dislocating forces on the apparatus.

I have found that these dislocating forces may be very simple and effectively balanced by means of chambered expansion means coupled to the condenser, or like apparatus, at or near the respective inlet and outlet conduits and bridging the flexible couplings, the chambers then being cross-connected to the condenser in such a manner that the sums of the forces exerted at the points of former unbalance tend to equalize. By properly orienting the expansion means with respect to the several inlet and outlet conduits, all unbalance may be eliminated.

In the disclosed embodiment, I have combined the chambered expansion means with the flexible couplings normally provided in these conduits, thereby enabling force and torque neutralization apparatus to be applied to existing and contemplated apparatus merely by altering the structure of the flexible couplings and making the indicated connections. In this manner the cost of equipping apparatus with my improved torque neutralizer is kept to a minimum.

Other objects will be more apparent from an examination of the following disclosure:

In the drawing:

Fig. 1 is a side elevational view of a steam condenser equipped with my torque neutralizing expansion joints, portions of the expansion joints and the inlet and outlet conduits being broken away and shown in section.

Fig. 2 is a plan view of a somewhat different type of condenser having dual intake and outlet conduits and divided water tubes, the expansion chambers being cross-connected in a somewhat different manner.

Fig. 3 is an end view of the device shown in Fig. 1, portions of the condenser being broken away to show the water tubes.

Fig. 4 is a cross section taken along the lines 4—4 of Fig. 1.

The invention is hereinafter exemplified in its application to a steam turbine condenser, although it is in no way limited thereto and has application to any vessel or apparatus similarly subject to differential pressures.

A steam condenser 10, as best shown in Fig. 1, is conventionally mounted at a level below that of a steam turbine or the like (not shown), the exhaust steam passing from the turbine to the condenser through the steam intake manifold 11. The exhaust steam passes over the cold water tubes 22, condenses, and collects in a hot well 12, from which the condensate is discharged through the pipe 13.

The condenser 10 is conventionally supported upon pillars 14 by means of heavy coil springs 15 which act between the condenser shoulders 16 and the pillars. The springs 15 will normally accommodate moderate thermally induced dislocations between the condenser and the steam turbine.

In order to cool the condenser for the purposes of condensing the steam, the condenser is supplied with cooling water or the like which is conveniently drawn from a lake or river through pipe 19. Pipe 19 leads to the intake of pump 20, which impels the cooling water through the condenser intake conduit 21 and thence, as best shown in Figs. 1 and 3, through the several water tubes 22 of the condenser and out the condenser outlet conduit 23. Conduit 23 connects with the pipe 24, which discharges the used water back to the river or lake.

Intermediate the terminal conduits 21, 23 and pipes 19, 24 are pipe sections 26, 27 respectively, which are rigidly supported by the floor 25, and are thus stationary. Between the pipe sections 26, 27 and terminal conduits 21, 23 are expansion elements, or flexible couplings, indicated generally as 29 and 290. Each of the flexible couplings comprises inner and outer walls of which the inner is a flexible coupling proper comprising a cylindrical flexible wall of sleeve 31, 310, annularly pleated and of approximately the same diameter as the conduit. The wall may be of rubber or flexible metal. These joints are free to yield universally to accommodate thermal dislocations of the condenser on its spring mountings.

As best shown in Figs. 1 and 4 each of the flexible couplings 29, 290, further comprises an annular expansion chamber 32, 320 between the inner wall 31, 310 and a concentric flexible outer wall or sleeve 33, 330. Top and bottom annular plates 39, 390 and 38, 380 complete the annular chamber. Plates 38, 380 are fixed to the stationary pipe sections 26 and 27 respectively, and plates 39, 390 are fixed to the condenser conduits 21 and 23 respectively for movement therewith.

A cross-connecting pipe 34 leads from connection 41 in conduit 21 to chamber 320, and cross-connecting pipe 35 leads from connection 40 in pipe 23 to chamber 32. These cross-connections are for the purpose of equalizing the pressures at opposite ends of the condenser, as hereinafter described.

The nature of the torque forces on the condenser will be briefly described. As best shown in Fig. 1 the fluid pressure on the intake side of the condenser may be expressed as exerted across the flexible coupling 29, and as indicated by the arrow "A," acts to exert an upward force against the inlet end of the condenser. The fluid discharge through the outlet conduit 23 will likewise exert pressure across the outlet flexible coupling 290 and on the condenser in the direction of arrow "B." The force indicated by arrow "B" will vary depending upon the nature of the external connection of the pipe 24 and the condition of the internal water tubes 22 of the condenser. The force indicated by arrow "A" will be constant and equal to the pressure delivered by the pump 20.

The force indicated by arrow "B" will always, under normal conditions of operation, be less than the force indicated by arrow "A" and thus a torque will be exerted on the condenser in the upward direction of the force indicated by arrow "A" and proportional to the amount of unbalance or difference between the forces indicated by arrows "A" and "B." Such force tends to tilt the condenser bodily on its spring mounts 15 and, unless otherwise compensated, requires bracing or other precaution to prevent excessive condenser dislocations. As the length of a condenser in this art is normally in the range of 30 feet more or less from inlet to outlet, and the diameter of the inlet and outlet pipes 21 and 23 is typically in the range of 60 inches, a difference of as little as 5 or 10 pounds per square inch between pressures indicated by arrows "A" and "B" will result in a turning torque or moment on the condenser measured in hundreds of thousands of foot pounds.

Unbalanced forces of this magnitude are common in this art as the pressure drop of the cooling water from condenser inlet to outlet, due to the friction of even clean water tubes 22, is hardly ever less than five (5) p. s. i., and in fouled condensers may reach a pressure drop of twenty (20) p. s. i. or more.

Where the discharge of the cooling water is aided by connecting the outlet conduits in the manner of a siphon, an even larger pressure differential between "A" and "B" occurs. In the system contemplated, the pipe 24 leads directly to an open body of water such as a lake or a river at a level lower than the condenser 10 with consequent siphon action which helps draw the water from the condenser and reduces the pressure "B" and increases the pressure differential between "A" and "B."

In cases where there is a large siphon at the condenser outlet the force "B" may be a negative quantity with consequent amplification of the pressure unbalance and torque effect. However, the application of my torque neutralizing device will be as equally effective to balance such forces, as in cases where both forces "A" and "B" are positive.

In this art the connections to the condenser are such that an outlet siphon is normal. In the great majority of cases the force indicated by arrow "B" is negative. Thus, in effect, the force across flexible coupling 310 is downward. In these cases the force indicated by the arrow "B" remains more or less constant because of the siphon and the force indicated by the arrow "A" tends to vary depending upon the cleanness of the tube sheet 22. As the tube sheet becomes fouled the velocity of water flow must increase to supply the requirements of the siphon. This requires the pump supplying the water to increase its head to force the water at increased velocity through the fouled tubes.

It is for the purpose of neutralizing this unbalance of forces caused by the flow of the cooling fluid through the condenser that I provide the force equalizing chambers 32, 320. As before noted the annular plates 38, 380 and 39, 390 are respectively connected to the stationary pipe sections, 26, 27, and the floating condenser inlet and outlet conduits 21, 23. Thus pressures developed in the chamber 32, 320 will apply to the respective plates 39, 390 at the condenser inlet and outlet the same number of pounds per square inch to which the pipe at the other end of the condenser is subject.

While broadly the area $b$ of the chambers may be varied to correlate with the pressure at the point of connection of the pipes 34 and 35 to the vessel 10, to equalize the force across each flexible coupling, in the preferred embodiment the annular area $b$ of each chamber is made equal to the circular area $a$ of the conduits extending therethrough. Thus by making connections 40 and 41 at opposite terminal connections of the vessel the differential pressures within the chambers will be equal and opposite to the differential of conduit pressures, and the forces on the condensers balanced.

While the source of the balancing pressures is broadly immaterial, an important feature of the invention is the simple cross-connection of the differential pressures in the respective conduits to the opposite expansion joints chambers so as to produce a pressure balance and exert on each end of the condenser a force equal to that on the other end of the condenser, thus eliminating all torque and turning movement.

In Fig. 2 a somewhat different type of condenser 44 is illustrated. This condenser has a divided water flow with dual intake conduits 45 and 46 and dual outlet conduits 47, 48. The water or cooling fluid is forced through the condenser by means of the dual impellers 49, 50 and will divide in a random manner through the condenser cooling tubes and will discharge through the discharge pipes 61, 62 connected to outlet conduits 47, 48. The impellers 49, 50 and discharge pipes 61, 62 are stationary and the condenser 44 is floatingly mounted therebetween as hereinbefore described in connection with the apparatus of Fig. 1.

In this type of divided flow condenser, dampers 51 and 52 are provided which enable one longitudinal half of the condenser to be withdrawn from service, while leaving the remaining longitudinal half of the condenser operative.

The inlet conduits 45 and 46 and the outlet conduits 47 and 48 are provided with vertically oriented flexible couplings and force equalizing chambers 53, 54, 55 and 56 of the same structure as those shown in the embodiment of Fig. 1, and which permit relative movement between the condenser and the stationary pipes and impellers. In this embodiment expansion chamber 53 is cross-connected through the pipe 57 to inlet pipe 46 at the other side of the dual condenser. Chamber 54 is cross-connected by pipe 58 with inlet pipe 45. Similarly chambers 55 and 56 are respectively cross-connected by pipes 59 and 60 with inlets 47 and 48.

With both cooling halves of the condenser in service the forces across the opposed expansion elements 53, 54, and 55 and 56 are in substantial equilibrium and no torque is exerted on the condenser. This, of course, assumes equal pressure in the pumps 49 and 50.

But for the present invention, however, when one half of the condenser cooling system is taken out of service, as by closing the dampers 51 and 52 or stopping one or the other of pumps 49, 50 or when, regardless of cause, there tends to be unbalance, the equilibrium would be destroyed. In the present invention, however, cross-connecting lines 57, 58, 59 and 60 transmit equalizing pressures to the expansion chambers to restore equilibrium in much the same manner as described in connection with the embodiment of Fig. 1.

In either arrangement the balancing structure is continuously effective to balance the forces on the condenser.

While broadly the force equalizing chambers may be entirely physically separate from the flexible couplings, the physical changes necessary to substitute for a conventional flexible coupling a joint and coupling having the required expansion chamber are relatively minor. Accordingly, the modification of existing structure involved in providing force balancing structure according to the present invention is relatively small as compared to that necessary to brace and reinforce the condenser mounting against an otherwise unbalance of forces.

This system is readily applicable to a variety of installations such as those exemplified in Figs. 1 and 2, and it is evident that like adaptations may be made to correct unbalance of forces in a multiplicity of other types of apparatus upon which differential fluid pressure are exerted.

I claim:

1. In apparatus of the character described comprising a yieldably mounted vessel containing fluid at differential pressures at different portions thereof, relatively stationary pipes proximate said vessel, terminal connections from said vessel to said pipes, and flexible couplings between said pipes and said terminal connections, the improvement which comprises chambered expansion means connected across said flexible couplings, and fluid connections from said chambered expansion means to said vessel at portions thereof remote from the chambered expansion means to which the fluid connection is connected.

2. The device of claim 1 wherein said terminal connections to said pipes are at opposite sides of said vessel, said fluid connections to said chambered expansion means comprising cross-connections to opposed terminal connections.

3. The device of claim 1 wherein said flexible couplings comprise expandable walls in said terminal connections, said chambered expansion means comprising a wall concentric with said expandable wall and forming with said expandable wall a closed pressure chamber.

4. The device of claim 3 wherein the effective cross sectional area of said chamber is substantially equal to the effective cross sectional area of the terminal connection.

5. A device of the character described comprising a yieldably mounted vessel having spaced terminal fluid carrying connections, relatively stationary pipes mounted in alignment with said terminal connections, first expansion joints between and subject to pressure in said pipes and said terminal connections, and second expansion joints enclosing the first joints and spaced therefrom to provide pressure chambers and pressure connection means for supplying the respective pressure chambers with pressures different from the pressures in the first expansion joints within said chambers.

6. The device of claim 5 wherein said terminal connections constitute inlet and outlet connections oppositely disposed on said vessel respecting the yieldable mounting thereof.

7. The device of claim 5 wherein said terminal connections are oppositely disposed on said vessel respecting the yieldable mounting thereof and constitute paired inlet and paired outlet connections.

8. The device of claim 5 wherein said pressure connection means to the respective chambers extend into communication with the fluid connections at respectively opposite ends of the vessel.

9. In apparatus of the character described comprising a vessel having a yieldable mounting, spaced inlet and outlet connections normally at differential pressure, relatively stationary inlet and outlet pipes aligned for connection with said inlet and outlet connections and flexible couplings between said pipes and connection, the improvement which comprises chambered expansion means bridging said flexible couplings and connections from said chambered expansion means to said vessel whereby to place said chambered expansion means under pressure, the effective area of said chambered expansion means and point of connection of said last mentioned connections with said vessel being such that the forces across said flexible couplings are balanced.

10. The device of claim 9 wherein said flexible couplings and said chambered expansion means are unitary and comprise coaxial multiple chambers having substantially equal effective area.

11. In apparatus of the character described comprising a vessel having a yieldable mounting, mutually spaced paired inlet and paired outlet connections subject to differential pressures, relatively stationary inlet and paired outlet pipes aligned respectively for connection with said paired inlet and paired outlet connections and flexible couplings between said pipes and said connections, the improvement which comprises chambered expansion means bridging said flexible couplings and connections from said chambered expansion means to said vessel whereby to place said chambered expansion means under pressure, the effective area of said chambered expansion means and point of connection of said last mentioned connections with said vessel being such that the forces across said paired inlets and said paired outlets are balanced.

12. The device of claim 11 wherein said flexible couplings and said chambered expansion means are unitary and comprise coaxial multiple chambers having substantially equal effective area.

13. In combination, a pair of multiple expansion joints each comprising apertured mounting heads, an inner tubular axially expansible wall connection with said heads about their apertures and providing closed communication between said apertures, an outer axially expansible wall connecting said heads about the inner wall and defining with said heads and inner wall an expansion chamber, and pipe means cross-connecting the chamber of each multiple joint with the interior of the tubular wall of the other joint.

References Cited in the file of this patent
UNITED STATES PATENTS

| Number | Name | Date |
|---|---|---|
| 1,573,792 | Allerton | Feb. 23, 1926 |
| 1,780,477 | Grace | Nov. 4, 1930 |
| 1,780,478 | Grace | Nov. 4, 1930 |
| 2,014,355 | Hussman | Sept. 10, 1935 |
| 2,333,031 | Miller | Oct. 26, 1943 |
| 2,348,833 | Miller | May 16, 1944 |
| 2,406,234 | Marancik et al. | Aug. 20, 1946 |
| 2,493,404 | Haynes | Jan. 3, 1950 |
| 2,545,701 | McCausland | Mar. 20, 1951 |